Nov. 16, 1943.    F. M. ARCHIBALD    2,334,532
REFINING OIL-SOLUBLE SULPHONATES
Filed April 24, 1941
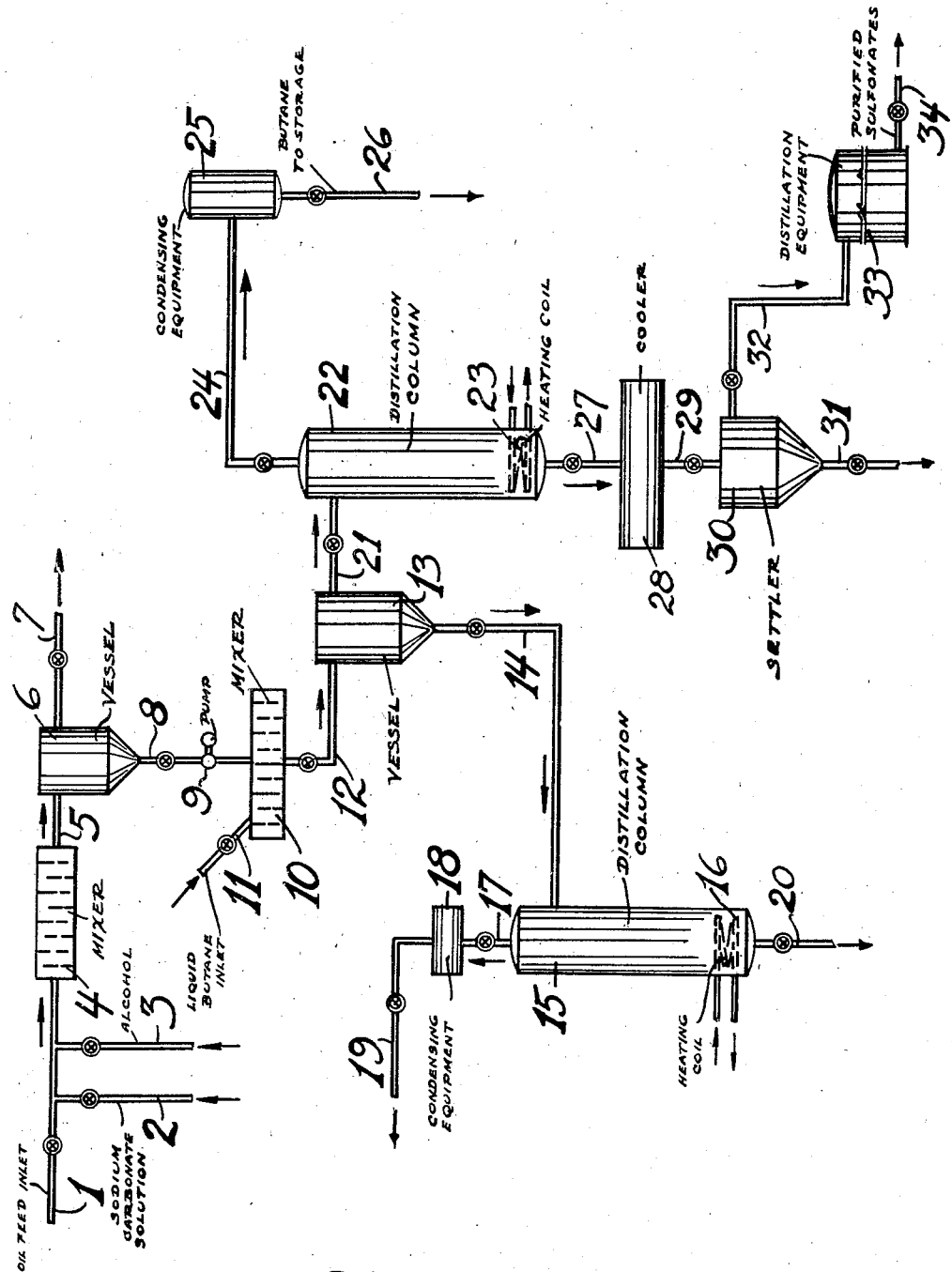

Patented Nov. 16, 1943

2,334,532

UNITED STATES PATENT OFFICE 2,334,532

REFINING OIL-SOLUBLE SULPHONATES

Francis M. Archibald, Elizabeth, N. J., assignor to Standard Oil Development Company, a corporation of Delaware Application April 24, 1941, Serial No. 390,129

5 Claims. (Cl. 260—504)

This invention relates to an improved method of refining oil-soluble sulphonates recoverable from petroleum oil after intensively treating with sulphuric acid and more particularly to the preparation of commercially desirable oil-soluble sulphonates derived from petroleum distillates suitable for treatment in the manufacture of medicinal white oils.

Oil-soluble sulphonates are usually prepared from oils intensively treated with sulphuric acid and neutralized with alkali solutions. The sulphonate compounds are usually extracted from the oil by treatment with aqueous alcoholic solutions and then the water and alcohol removed under carefully controlled conditions. In order that the sulphonates prepared in this manner may have desirable properties suitable for their use as emulsifying and detergent agents and also for uses as additives in textile lubricants, there must be adequate control in the purification procedure, the purpose of which is to insure the substantial freedom of the resultant products from inorganic salts and moisture.

The usual method of purifying the sulphonate consists in distilling the aqueous alcohol from the extract liquid containing the crude sulphonate and taking up the residue in concentrated alcohol or other solvent in which the undesirable impurities associated with the sulphonate are substantially insoluble. Isopropyl alcohol of 70% strength or higher is commonly used. Strong ethyl or methyl alcohol also fulfills the requirement. The thus treated sulphonates usually contain small quantities of oil initially associated with the crude sulphonate material. The presence of this oil as an impurity in the refined sulphonate does not affect disadvantageously many of the desired uses of the sulphonates and, therefore, is not usually objectionable from the commercial sales viewpoint.

It has now been found that when crude oil-soluble caustic alkali-free sulphonate in a hydrophilic solution of boiling point up to about 100° C. is mixed with a minor quantity of a more volatile, chemically inert hydrophobic solvent preferably of boiling point up to about 70° C. the solubility for water of the hydrophilic solution is thereby greatly reduced and almost all the water and inorganic salts associated with the crude sulphonate material can be precipitated from solution and separated as an aqueous layer. This discovery furnishes a method of removing water and inorganic salts as impurities, from crude oil-soluble sulphonates. The method is applied particularly to the impure or crude sulphonate dissolved in a hydrophilic liquid such as the aqueous alcohol which is ordinarily employed for extraction of such from the oil after neutralization. A chemically inert hydrophobic liquid having a relatively lower boiling point than the hydrophilic liquid is added and in this manner there is obtained a diphase system of a solution of the sulphonate in the mixed solvents as one phase and a salt separation consisting of water and inorganic salts as the other phase, separating the phases and recovering from the mixed solvent phase, preferably by distillation and fractionation, the purified sulphonates.

While the sulphonates prepared in this manner usually require further treatment to remove therefrom additional quantities of water and inorganic salts to be commercially saleable, the method is advantageous in separating from the crude sulphonates most of the water and inorganic salts present in the crude sulphonate materials. However, it has also been found that, if the hydrophilic liquid be a low molecular weight monohydric alcohol and the hydrophobic liquid added to the hydrophilic solution be of low molecular weight such as butane and the solution after the separation of the aqueous phase be distilled to remove the hydrophobic constituent, further quantities of water and inorganic salts can usually be separated from the solution when the solution is allowed to cool and settle. In this manner after evaporating off the alcohol sulphonates of good commercial quality are obtained. In addition, as a practical matter, it is desirable after the separation of the aqueous salt layer in the first instance to remove the hydrophobic constituent from the sulphonate solution because that component appears to affect adversely the subsequent separation of the remaining quantities of water and inorganic salts. This method of purification is generally applicable to the refining of sulphonates containing no free caustic alkalinity.

An application of the invention commonly employed is the solution of crude sulphonates in one of the monohydric alcohols containing not more than five carbon atoms in the molecule, usually isopropyl alcohol, and precipitating from such solutions the water and inorganic salts by the addition of a low boiling hydrocarbon such as butane or petroleum ether. Usually after the separation of the aqueous phase the sulphonate solution is mildly alkaline to litmus, indicating the presence of traces of inorganic impurities. The sulphonate solution is then usually distilled to remove the lower boiling hydrocarbon, cooled, allowed to settle and any further quantities of water and inorganic salts removed. As a general rule, the sulphonate solution after removal of these impurities is neutral to litmus. Indeed, adequate settling time in this final purification step is indicated when the sulphonate solution is neutral to litmus. If the sulphonate content in the final solution is high, such may prevent complete salt separation. To obviate this disadvantage, additional alcohol should be added before settling. It is preferable, however, to have the required sufficiency of alcohol in the making of the initial extraction of the crude sulphonate material. The clear alcoholic layer is withdrawn after settling and the purified sulphonate recovered by distillation.

The method of the invention is particularly applicable to the treatment of aqueous alcoholic solutions boiling about 100° C. containing sulphonates in an amount not in excess of 8% of the total volume of the solution. Generally, the extraction is controlled so that the sulphonate is not less than 2% by volume of the total solution. The light hydrocarbon material usually employed to effect the separation of the aqueous phase is a hydrocarbon or derivative thereof boiling below about 70° C. This boiling point limitation is set in order to permit ready recovery of the hydrocarbon by distillation from the monohydric alcohol usually employed for the extraction of the crude sulphonate, but the scope and spirit of the invention is clearly not restricted by this practical advantage, since it is apparent that the principle of the invention is capable of more extensive application. The amount in which this material is added depends upon the concentration of the sulphonate salt present in the solution and also upon the amount of inorganic salts and water present in the alcoholic solution. Hydrocarbons of lower molecular weight are also preferable on account of the fact that a smaller proportion of the lower molecular weight hydrocarbon is required to effect the diphase separation. The higher the concentration of the inorganic salts, the easier it is found to effect the separation of the aqueous phase.

Usually the amount of the precipitating agent added to the aqueous alcohol solution varies in amount between about 7.5% and 25% by volume of the aqueous alcohol solution. The precipitating agent may be added at atmospheric pressure, but it is usually preferable to add a very low boiling liquid such as butane to the aqueous alcoholic solution and employ pressure upon the system to maintain the butane in the liquid condition.

The use of the light hydrocarbon, according to the method of the invention, differs from the use in the prior art of hydrocarbons to separate oil constituents since no oil separation is intended or, in general, occurs in the process of the invention. However, if desired the solution of the crude sulphonate material may be treated with a higher hydrocarbon such as petroleum solvent naphtha (120° C. to 200° C.) in order to separate from the crude sulphonate any associated oil, and the oil-free crude sulphonate may be treated further to remove inorganic salts by the process of the present invention. The sulphonate concentration in the alcohol solution according to the invention must be sufficient to form a three component homogeneous phase of sulphonate, alcohol, and hydrocarbon from which there can be made to separate by the addition of the hydrophobic liquid an aqueous phase containing the salts but substantially no sulphonate. Thus, from a solution containing 6% of an oil-soluble sulphonate in 50% isopropyl alcohol containing a small amount of inorganic salts, the addition of solvent naphtha (boiling between about 120° C. and 200° C.) caused the separation of a naphtha phase containing some oil constituents and some sulphonate material. This use of solvent naphtha may, as previously stated, be employed as a means of removing some of the oil constituents associated with the crude material as a result of its extraction from the neutralized oil with the aqueous alcohol solution. On the other hand, when light hydrocarbons or petroleum ether was added to another sample of the same solution, a separation occurred of an aqueous phase amounting to about 35% of the total volume of the solution and in this aqueous phase almost all of the inorganic salts were present while in the hydrocarbon phase substantially all of the sulphonates are present. Washing the alcohol-hydrocarbon-sulphonate solution with water after the separation of the aqueous phase does not give any further salt removal because the mixture does not contain inorganic salts in sufficient amounts to bring about their precipitation in the form of a concentrated aqueous solution.

The invention can be illustrated by the process as applied to an 8% solution of sulphonate compounds in 50% aqueous isopropyl alcohol. Such solutions of sulphonates are commonly obtained by extracting the neutralized oil phase in the preparation of mineral white oils with 50% aqueous isopropyl alcohol solution. The addition of 15% by volume of butane to one of such solutions caused the formation of a lower aqueous layer in which over 90% of the inorganic salts associated with the crude sulphonate were dissolved in about 90% of the water present. After removing the aqueous salt layer and distilling the alcohol solution to remove the butane, there was taken from the system a sample, alkaline to litmus which contained six gallons of sulphonate dissolved in 36.6 gallons of alcohol. In this sample the sulphonate concentration was therefore about 13.3% by volume. At this concentration the residual inorganic salts were unable to separate completely on standing. In order to effect the precipitation of these inorganic impurities, an equal quantity of isopropyl alcohol was added and the mixture allowed to settle for several days. A clear sulphonate liquor was obtained neutral to litmus. It was evaporated and the sulphonate blended with oil and dried. When 10% of this sulphonate salt was dissolved in a mineral white oil of 100 Saybolt viscosity at 100° F. and the mixture shaken with 10 volumes of water, a good emulsion was formed. Emulsification of mineral oils of this viscosity with about 10% of sulphonate material is an indication of desirable commercial quality in oil-soluble sulphonate materials.

The relative effect of adding various types of low boiling materials to the aqueous alcoholic solution is illustrated by the following experiments:

*I*

80 cc. of a crude sulphonate solution containing 6.5 grams of sulphonate and an unknown quantity of sodium sulphate, sodium sulphite and sodium carbonate was dissolved in 50% isopropyl alcohol. To this mixture 20 cc. of petroleum ether (B. P. 60° C.) was added at room temperature. An aqueous layer amounting to 34.5 cc. separated on standing. On heating to 50° C. the volume of this layer was reduced to 33 cc. After removing the aqueous layer the sulphonate solution was found to be slightly alkaline to litmus. To this solution 33 cc. of water was added. The addition of this quantity of water produced a homogeneous solution. The separation of the aqueous layer from the isopropyl alcohol-petroleum ether solution is therefore a direct consequence of the content of inorganic salts.

II

When the petroleum ether in the above test was replaced by butane, the separation of the aqueous layer amounted to 35 cc. The butane was reduced to 10% of the total mixture without substantially decreasing the amount of the salt solution separation. The supernatant homogeneous solution of butane, alcohol and sulphonate was slightly alkaline to litmus. The solution was allowed to weather at room temperature and thus a considerable portion of the butane was removed. Removal of the butane in this manner caused a further separation of an aqueous salt layer which amounted to 5%, and elimination of all traces of alkalinity to litmus in the solution. The sulphonate recovered from the alcohol solution was of good commercial quality and a high degree of purity as indicated by its emulsification characteristics.

III

When an isopropyl alcohol solution containing crude sulphonate material was diluted with an equal volume of 50% isopropyl alcohol and in one case 20% by volume of petroleum ether was added, and in another case 20% by volume of butane was added, the solution remained homogeneous in the first case while in the second case, that is, when the butane was added an appreciable separation of an aqueous layer occurred.

This difference in effect of petroleum ether and butane establishes the superiority of the lower molecular weight hydrophobic liquids as precipitating agents for water and inorganic salts associated with the crude sulphonates dissolved in hydrophilic solutions.

For purposes of illustrating to a further extent the invention, the processing of a crude sulphonate compound in suitable equipment is described. To appreciate fully this description, reference is made to the accompanying drawing.

Mineral oil of lubricating oil consistency which has been previously intensively treated with sulphuric acid to remove all the colored and chemically unstable compounds and from which the sludge had been separated, is passed through line 1 and mixed with a sufficient quantity of a 10% aqueous sodium carbonate solution passed through line 2, and a sufficient quantity of isopropyl alcohol passed through line 3 to neutralize the oil and dissolve the sulphonate compounds so formed after passing through mixer 4. The resultant mixture is then passed through line 5 to the vessel 6 in which time is allowed in this vessel of sufficient capacity to permit the separation of the aqueous alcoholic layer as a lower layer from the neutralized oil. The oil is passed through line 7 for further processing in the preparation of mineral white oils.

The lower aqueous alcoholic layer from the vessel 6 is passed through line 8 through a pump 9 operating to give about 25 lbs./sq. in. pressure, and then to a mixer 10 to which is also supplied through line 11 liquid butane under about 25 lbs./sq. in. pressure in an amount of 20% by volume. A pressure about 25 lbs./sq. in. is maintained upon the mixer 10 to insure that the butane is maintained in liquid condition. The mixture then passes through line 12 to a vessel 13 in which time is allowed for water precipitated from solution to separate as a lower aqueous phase.

The lower aqueous phase is separated, the pressure thereon released and then removed through line 14 to a distillation column 15. In the base of the column 15 open steam is injected through the coil 16. Passing overhead from the column 15 through a line 17 are vapors of alcohol which are condensed in equipment 18 and passed through line 19 into storage. From the base of the column 15 the salts are removed through line 20 to the sewer.

The upper layer from the vessel 13 is passed through line 21 to the column 22 operated at about atmospheric pressure. At the base of the column is a steam coil 23. Passing overhead from the column 22 through line 24 are vapors of butane which are condensed and compressed in equipment 25. The butane so obtained is passed through line 26 to storage. From the base of the column 22 the isopropyl alcohol solution of purified sulphonate salt is removed through line 27 and passed through a cooler 28. From the cooler 28 the solution is passed through line 29 to settler 30. The lower aqueous layer is removed and passed through line 31 to the sewer. The supernatant alcohol solution of purified sulphonate salts is passed through line 32 to distillation equipment 33 in which the alcohol is recovered as distillate and the purified sulphonates as the distillation residue 34.

The invention having now been described with reference to specific embodiments, it will be apparent to those skilled in the art that the invention is not limited thereby but is capable of other modifications not particularly shown or described.

What is claimed is:

1. An improved purification procedure in the refining of oil-soluble petroleum sulphonates, which comprises dissolving the oil-soluble petroleum sulphonates in an approximately 50-50 aqueous monohydric alcohol solution constituting a hydrophilic solution miscible with an aliphatic hydrocarbon boiling below 70° C. and constituting a hydrophobic liquid, adding the hydrophobic liquid in an amount to separate an aqueous phase only, allowing the phases to stratify, separating the lower aqueous phase, and removing from the other phase the hydrophobic liquid to obtain the purified sulphonate.

2. The process of preparing solutions of sulphonate salts of a sufficiently high degree of purity and concentration for use as surface active agents and as additives in textile oils, which comprises treating petroleum oils intensively with sulfuric acid, separating the resultant sludge, neutralizing the oil phase with a non-caustic alkali in an aqueous alcohol solution of about 50% strength, separating the aqueous alcohol solution containing the sulphonate salts to form a solution containing not more than 8% by volume of sulphonate salts, treating the aqueous alcohol solution with a liquid hydrocarbon material boiling below about 70° C. to cause the separation of an aqueous phase, only separating the aqueous phase thus formed, distilling the hydrocarbon from the other phase, cooling, allowing to settle, separating any aqueous phase, evaporating the remaining solvent from the resultant solution and collecting the purified sulphonate material.

3. Process according to claim 1 in which the aqueous alcohol solution is a 50% aqueous isopropyl alcohol solution.

4. Process according to claim 1 in which the liquid hydrocarbon boiling below 70° C. is liquid butane.

5. Process according to claim 1 in which the liquid hydrocarbon boiling below 70° C. is petroleum ether.

FRANCIS M. ARCHIBALD.